(12) United States Patent  (10) Patent No.: US 8,276,326 B2
Lounis et al.  (45) Date of Patent: Oct. 2, 2012

(54) TELESCOPIC MAST SYSTEM

(75) Inventors: Said Lounis, Ann Arbor, MI (US); Kevin Dombrowski, Sterling Hgts, MI (US)

(73) Assignee: Serapid Inc., Sterling Heights, MI (US)

( * ) Notice: Subject to any disclaimer, the term of this patent is extended or adjusted under 35 U.S.C. 154(b) by 254 days.

(21) Appl. No.: 12/728,312

(22) Filed: Mar. 22, 2010

(65) Prior Publication Data

US 2011/0225903 A1  Sep. 22, 2011

(51) Int. Cl.
B66C 23/04 (2006.01)
B66C 23/34 (2006.01)
E04G 1/22 (2006.01)
E04G 1/18 (2006.01)

(52) U.S. Cl. ............ 52/122.1; 52/123.1; 52/126.1; 52/125.2; 52/111; 52/118; 212/199; 212/204; 212/264; 212/284

(58) Field of Classification Search .......... 52/122.1, 52/123.1, 125.2, 125.3, 125.6, 125.1, 116–118, 52/126.1, 111; 74/89.35, 89.38, 89.39, 89, 74/45, 89.28, 411.5; 70/181–189, 210, 216; 192/215; 188/265, 300; 248/354.1; 212/199–202, 212/204, 264, 284
See application file for complete search history.

(56) References Cited

U.S. PATENT DOCUMENTS

| | | | | |
|---|---|---|---|---|
| 2,832,567 A * | 4/1958 | Fletcher et al. | | 173/34 |
| 3,061,045 A * | 10/1962 | Gunning | | 187/226 |
| 3,064,761 A * | 11/1962 | Ramsey | | 187/229 |
| 3,344,890 A * | 10/1967 | Loef | | 187/229 |
| 3,372,823 A * | 3/1968 | Gibson et al. | | 414/634 |
| 5,102,375 A * | 4/1992 | Featherstone | | 474/155 |
| 6,224,037 B1 | 5/2001 | Novick | | |
| 7,240,885 B1 * | 7/2007 | Sullivan | | 248/354.1 |
| 7,270,619 B2 | 9/2007 | Bourc'His | | |
| 7,497,140 B2 * | 3/2009 | Blackwelder et al. | | 74/89.28 |
| 2006/0201076 A1 * | 9/2006 | Blackwelder | | 52/118 |
| 2006/0219144 A1 * | 10/2006 | Phelan et al. | | 114/90 |

* cited by examiner

*Primary Examiner* — Jeanette Chapman
(74) *Attorney, Agent, or Firm* — Bliss McGlynn, P.C.

(57) ABSTRACT

A telescopic mast system includes a telescopic mast comprising a plurality of telescopic mast sections and a drive mechanism for extending and retracting the telescopic mast sections. The drive mechanism includes a rigid chain having one end connected to a last one of the telescopic mast sections to move the telescopic mast sections and a plurality of guide plates cooperating with the telescopic mast sections to prevent buckling of the rigid chain.

20 Claims, 8 Drawing Sheets

TELESCOPIC MAST SYSTEM

BACKGROUND OF THE INVENTION

1. Field of the Invention

The present invention relates generally to masts and, more specifically, to a telescopic mast system.

2. Description of the Related Art

It is known to provide a telescopic mast to raise or lower an object such as a communication device, e.g., a surveillance camera. Typically, the telescopic mast includes a plurality of tubular mast sections that may be raised by air or cable power. In the air powered telescopic mast, air is supplied from a source to a pneumatic cylinder that raises the mast sections and when the air is discontinued to the pneumatic cylinder, gravity allows the mast sections to be lowered. In the cable powered telescopic mast, a winch and pulley is used with a cable to raise the mast sections and gravity is allows the mast sections to be lowered.

One disadvantage of the air powered telescopic mast is that if wind bends the mast such that there is lateral deflection, air will leak out between the mast sections. The same results can occur if a bullet hole or other type of shrapnel punctures the cylinder. As a result, the mast will lose pressure and not stay in the raised position. Another disadvantage is that the telescopic mast cannot be brought down quickly. Additionally, speed in lowering the mast is an important factor because these telescopic masts typically have expensive equipment such as a communication device mounted on top of the mast and, in a hostile environment, need to be lowered quickly. The current systems lower by gravity, and can bind due to dirt or ice. Another disadvantage of the air powered telescopic mast is that it can only support a low capacity load due to the small piston of the pneumatic cylinder.

One disadvantage of the cable powered telescopic mast is that it can only support a low capacity load because of the multiple mast sections, otherwise the cable becomes thick. Another disadvantage of the cable powered telescopic mast is that there is no control of speed in lowering the mast because the mast relies on gravity to be lowered. In addition, foreign objects such as ice or sand causes interference with the mast sections and the mast will not lower itself due to gravity. The current systems lower by gravity, and can bind due to dirt or ice.

Therefore, it is desirable to provide a telescopic mast system that is powered or driven and allows the mast to be raised and lowered relatively quickly. It is also desirable to provide a telescopic mast system that allow the mast to support a relatively high capacity load. It is further desirable to provide a telescopic mast system that can raise and lower a mast in hostile environments and is not affected by foreign objects such as ice and sand. Thus, there is a need in the art to provide a telescopic mast system that meets at least one of these desires.

SUMMARY OF THE INVENTION

It is, therefore, one object of the present invention to provide a new telescopic mast system.

It is another object of the present invention to provide a telescopic mast system that can be raised and lowered by power relatively quickly and not have to rely on gravity.

It is yet another object of the present invention to provide a telescopic mast system that can support relatively high capacity loads.

To achieve one or more of the foregoing objects, the present invention is a telescopic mast system. The telescopic mast system includes a plurality of telescopic mast sections and a drive mechanism for extending and retracting the telescopic mast sections. The drive mechanism includes a rigid chain having one end connected to a last one of the telescopic mast sections to move the telescopic mast sections and a plurality of guide plates cooperating with the telescopic mast sections to prevent buckling of the rigid chain.

One advantage of the present invention is that a new telescopic mast system is provided to raise and lower an object such as a communication device. Another advantage of the present invention is that the telescopic mast system includes a rigid chain to push the mast sections up relatively quickly to raise the telescopic mast and to pull the mast sections down relatively quickly to lower the telescopic mast. Yet another advantage of the present invention is that the telescopic mast system has a rigid chain disposed inside the mast sections and guide plates attached to the mast sections to prevent buckling of the rigid chain. Still another advantage of the present invention is that the telescopic mast system allows the telescopic mast to support relatively high capacity loads. A further advantage is that the telescopic mast system can be raised or lowered quickly and is not affected by the foreign objects such as ice and sand. Yet a further advantage of the present invention is that the telescopic mast system has a smooth motion with no drift. Still a further advantage of the present invention is that the telescopic mast system raises and lowers the mast at a relatively high speed and with a high stroke. Another advantage of the present invention is that the telescopic mast system is that the mast can sustain the raised position using a motor break and not creep down with loss of air pressure.

Other objects, features, and advantages of the present invention will be readily appreciated, as the same becomes better understood, after reading the subsequent description taken in conjunction with the accompanying drawings.

DESCRIPTION OF THE PREFERRED EMBODIMENT(S)

Referring now to the drawings, and in particular FIGS. 1 through 5, one embodiment of a telescopic mast system 10, according to the present invention, is shown for raising and lowering an object, generally indicated at 12, such as a communications device. The telescopic mast system 10 is supported by a support surface such as ground or in a vehicle (not shown) such as a military vehicle. It should be appreciated that the telescopic mast system 10 is used to quickly raise and lower the object 12. It should also be appreciated that the object 12 may be camera equipment, signage, material handling/manufacturing workstation, surveillance equipment, maintenance platform, personnel platform, etc.

Referring to FIGS. 1 through 5, the telescopic mast system 10 includes a mounting mechanism, generally indicated at 13, for rigidly mounting the system 10 to the support surface. In one embodiment, the mounting mechanism 13 may include a base 14 such as a plate. The base 14 is generally planar and made of a metal material. The base 14 includes a plurality of apertures extending therethrough. The base 14 is secured to the support surface by a suitable mechanism such as fasteners (not shown). It should be appreciated that, in the embodiment illustrated in the figures, the mounting mechanism 13 allows the system 10 to be free-standing.

The telescopic mast system 10 also includes a telescopic mast, generally indicated at 18, supported by the mounting mechanism 13. The mast 18 includes a plurality of telescopic mast sections 20. The mast sections 20 are generally tubular and tapered. The mast sections 20 may be made of a metal material such as aluminum or a composite material. In one embodiment, the mast sections 20 have a generally rectangular cross-sectional shape. It should be appreciated that telescopic mast sections 20 are known in the art.

In the embodiment illustrated in the figures, the first mast section 20 rests upon the base 14 and the other mast sections 20 are disposed inside of one another such that they are telescopic. The mounting mechanism 13 may also include at least one, preferably a pair of gussets 22 to support the mast in an upright position and generally perpendicular to the base 14. Each gusset 22 includes a main plate 24 having a generally triangular shape and a flange plate 26 extending perpendicularly from the main plate 24 at a bottom thereof. The main plate 24 and flange plate 26 are made of a metal material and are integral, unitary, and one-piece. The flange plate 26 is secured to the base 14 by a suitable mechanism such as fasteners 28 extending through the apertures 16 in the base 14. Each gusset 22 also includes a bracket 30 extending from the main plate 24 and disposed upwardly from the flange plate 26. The bracket 30 is generally rectangular in shape and has outwardly extending flanges 32. The main plate 24 and bracket 30 are made of a metal material and are integral, unitary, and one-piece. The bracket 30 is disposed about the first mast section 20 and the flanges 32 are secured together by a suitable mechanism such as fasteners 34. It should be appreciated that, in the embodiment illustrated in the figures, the gussets 22 support the mast 18 in an upright position upon and perpendicular to the base 14. It should also be appreciated that other mounting mechanisms may be used to rigidly mount the first mast section 20 to the support surface, for example, such as by brackets to a vehicle.

The telescopic mast system 10 also includes a drive mechanism, generally indicated at 36, to raise and lower the mast 18. The drive mechanism 36 includes an articulated column or rigid chain 38. The rigid chain 38 is commercially available from Serapid Inc. in Sterling Heights, Mich. It should be appreciated that the rigid chain 38 has links to interlock together and form a rigid column during forward thrust and the inner edges of the rigid chain 38 are bendable during retraction to allow it to coil up. It should also be appreciated that the rigid chain is conventional and known in the art.

The drive mechanism 36 may include at least one rotary driving pinion 40 for engaging the articulated column or rigid chain 38. The driving pinion 40 is mounted on a shaft 42 that is rotatably supported by the first mast section 20. It should be appreciated that the driving pinion 40 cooperates with the rigid chain 38 to move the rigid chain 38.

The drive mechanism 36 also includes a chain magazine, generally indicated at 46, to house the rigid chain 38. The chain magazine 46 includes an opposed pair of housing plates 48 each having a groove or channel 50 for housing the rigid chain 38. The housing plates 48 are orientated vertically and each have a flange plate 52 extending perpendicularly from the housing plate 48 at a bottom thereof. The housing plate 48 and flange plate 52 are made of a metal material and are integral, unitary, and one-piece. The flange plate 52 is secured to the base 14 by a suitable mechanism such as fasteners 54 extending through the apertures 16 in the base 14. It should be appreciated that other mounting mechanisms may be used to connect the chain magazine 46 to either the mast 18 or the support surface.

The drive mechanism 36 also includes a plurality of guide plates 56 at the bottom of each of the mast sections 20 for guiding the rigid chain 38 and for preventing buckling of the rigid chain 38. The guide plates 56 are generally rectangular in shape and have an aperture 58 extending therethrough to receive the rigid chain 38. The guide plates 56 are connected to the bottom of the mast sections 20 by a suitable fastening mechanism. The rigid chain 38 extends through the apertures 58 in the guide plates 56 and has one end connected to the guide plate 56 of the last mast section 20 and the other end disposed in the channel 50 of the chain magazine 46. It should be appreciated that the guide plates 56 prevent lateral movement of the rigid chain 38 and prevent buckling of the rigid chain 38. It should also be appreciated that the rigid chain 38 is disposed inside the mast 18 when extended and disposed in the channel 50 of the chain magazine 46 when retracted.

The drive mechanism 36 further includes a transfer box 60 cooperating with the shaft 42 for the driving pinion 40. The transfer box 60 is mounted about the shaft 42 and cooperates with the shaft 42 to rotate the shaft 42. The transfer box 60 is secured to the base 14 by a gusset 64 having a main plate 66, a mounting plate 68 secured to the transfer box 50 by a suitable mechanism such as fasteners 70, and a flange plate 72 secured to the base 14 by a suitable mechanism such as fasteners 74 extending through the apertures 16 in the base 14. The main plate 66, mounting plate 68, and flange plate 72 are made of a metal material and are integral, unitary, and one-piece. It should be appreciated that the shaft 42 extends through the transfer box 60 to allow the shaft 42 to be attached to a crank (not shown) for manually rotating the driving pinion 40.

The drive mechanism 36 also includes a motor 76 connected to the transfer box 60 to transfer rotary power to the shaft 42. The motor 76 is connected to a source of electrical power (not shown). The motor 76 may be a gear motor with a brake. The drive mechanism 36 further includes a four position rotary cam limit switch (not shown) to limit the rotation of the driving pinion 40 for extending and retracting the rigid chain 38. It should be appreciated that the motor 76 rotates an internal shaft that cooperates with the transfer box 60 to rotate the shaft 42 for the driving pinion 40. It should also be appreciated that the rotary direction of the motor 76 may be reversed to cause the driving pinion 40 to extend or retract the rigid chain 38.

The telescopic mast system 10 may also include a cable assembly, generally indicated at 80, for electrical communication with the object 12. The cable assembly 80 includes a rotatable reel 82 mounted to an "L" shaped bracket 84 that is secured to the base 14 by a suitable mechanism such as fasteners (not shown) extending through the apertures 16 in the base 14. The cable assembly 80 also includes a communication or electrical cable 86 wound on the reel 82. The cable 86 has one end extending about a pulley 88 connected to the base 14 through an aperture (not shown) in the first mast section 20 and through the mast 18 such that it is connected to the object 12. The cable 86 extends through an aperture 90 in the guide plates 56. The other end of the cable 86 is connected to a source (not shown). It should be appreciated that, when the mast 18 is raised, the cable 86 is unwound from the reel 82 and travels inside of the mast 18. It should also be appreciated that the reel 82 is spring loaded such that when the mast 18 is lowered, the reel 82 rotates to wind the cable 86 on the reel 82.

The telescopic mast system 10 further includes a mounting support 92 for mounting the object 12 to the mast 18. The mounting support 92 is secured to the top of the last mast section 20 by a suitable mechanism such as welding. It should be appreciated that the mounting support 92 may have any suitable configuration for mounting the object 12 to the mast 18.

Figure 1:
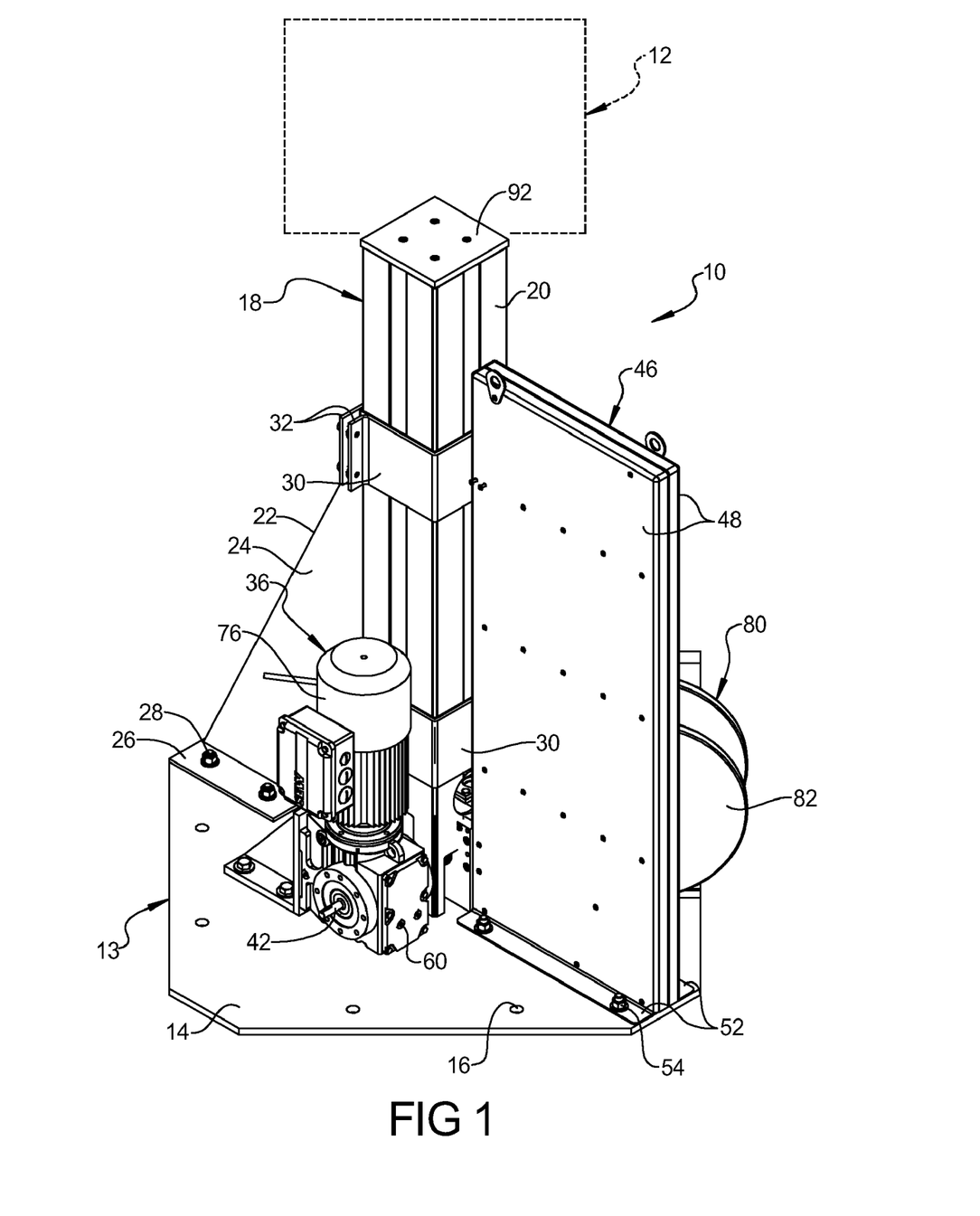
FIG. 1 is a perspective view of a telescopic mast system, according to the present invention, illustrated in operational relationship with an object.
Figure 2:
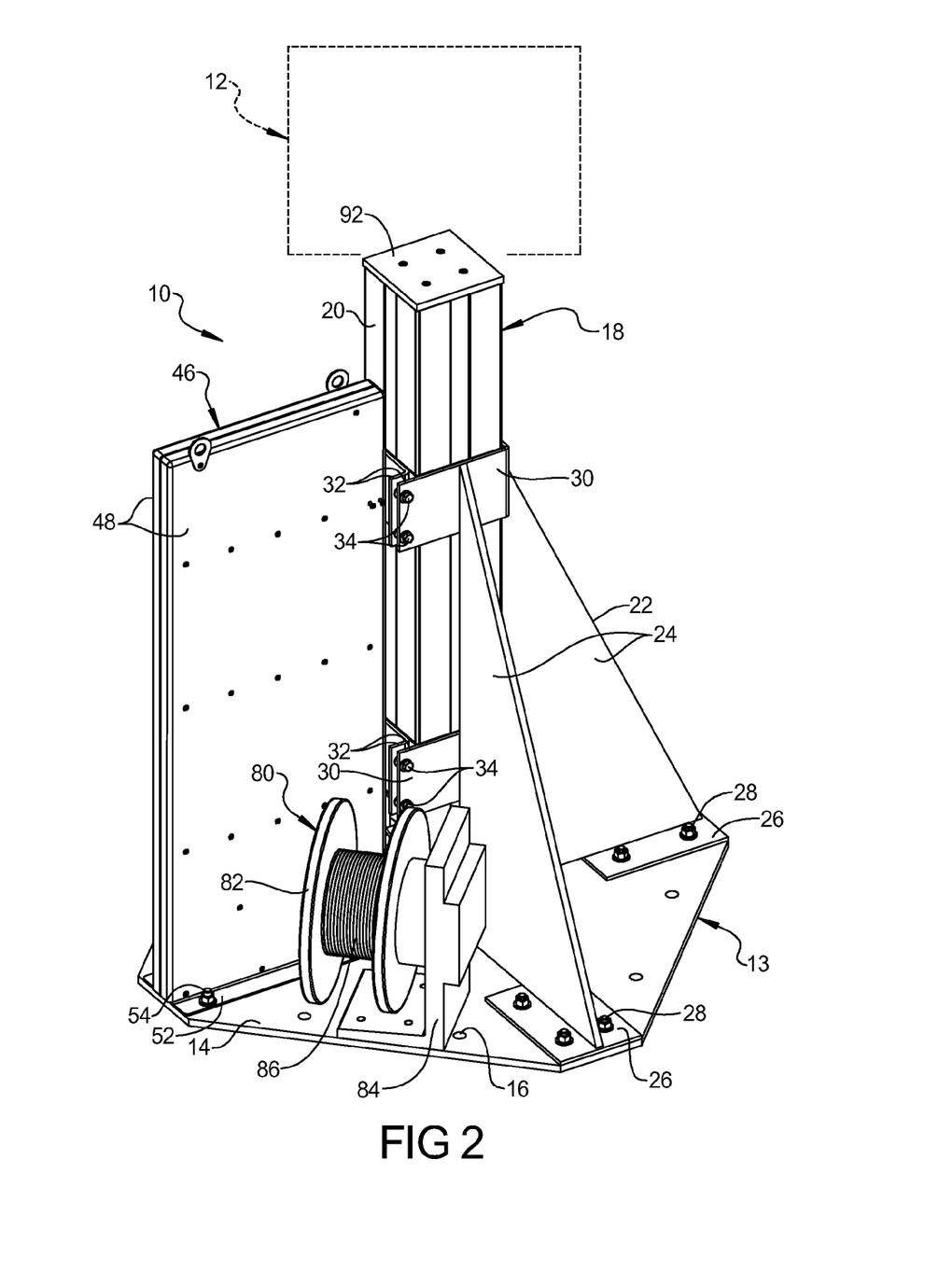
FIG. 2 is another perspective view of the telescopic mast system of FIG. 1.
Figure 3:
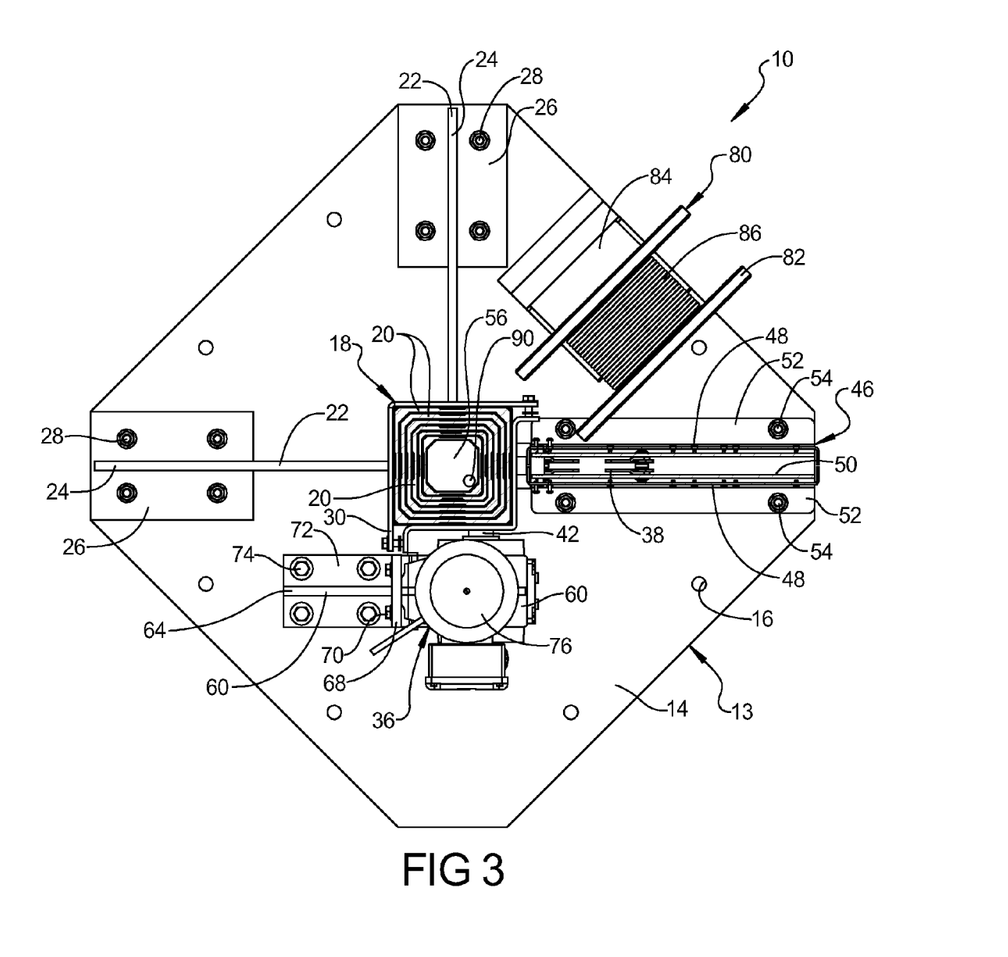
FIG. 3 is a plan view of the telescopic mast system of FIG. 1 with the object removed.
Figure 4:
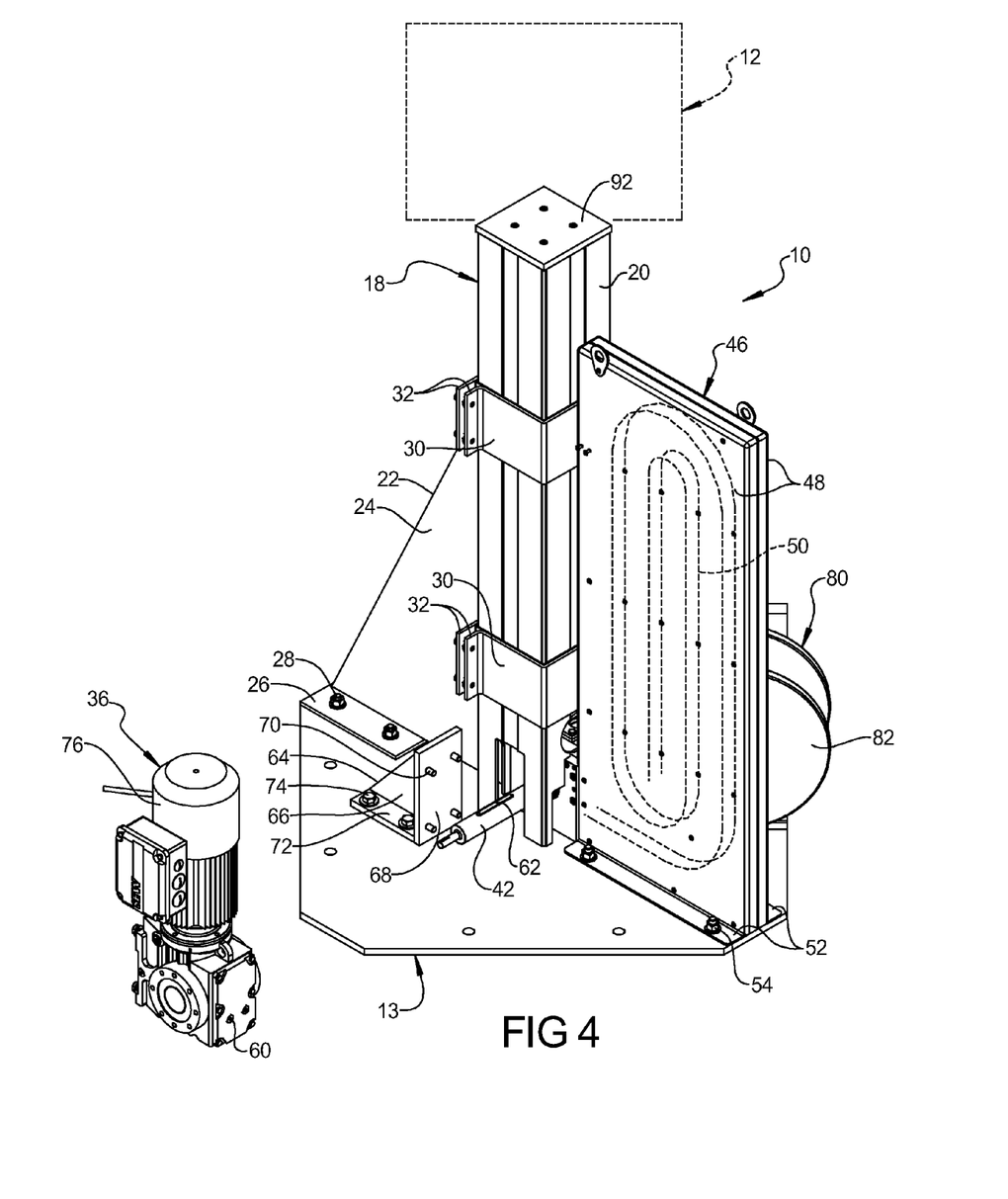
FIG. 4 is a partial exploded perspective view of the telescopic mast system of FIG. 1.
Figure 5:
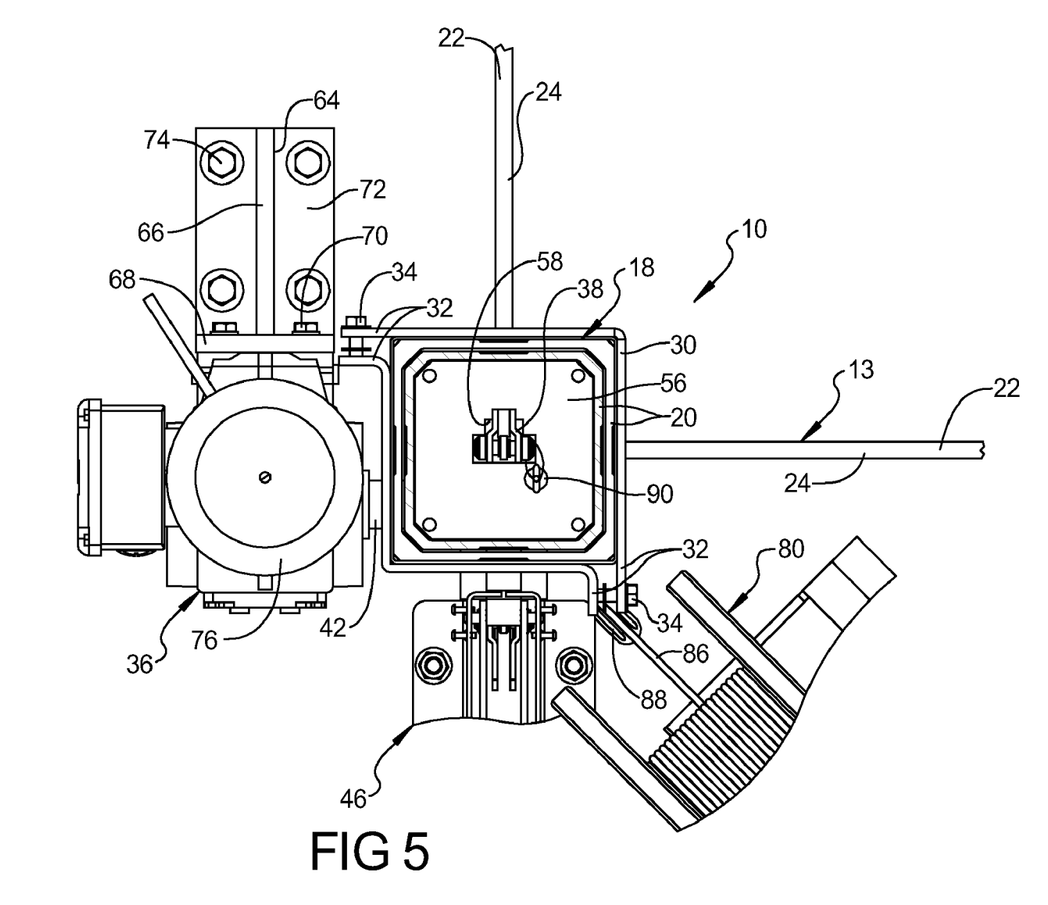
FIG. 5 is a sectional view of a portion of the telescopic mast system of FIG. 1.
Figure 6:
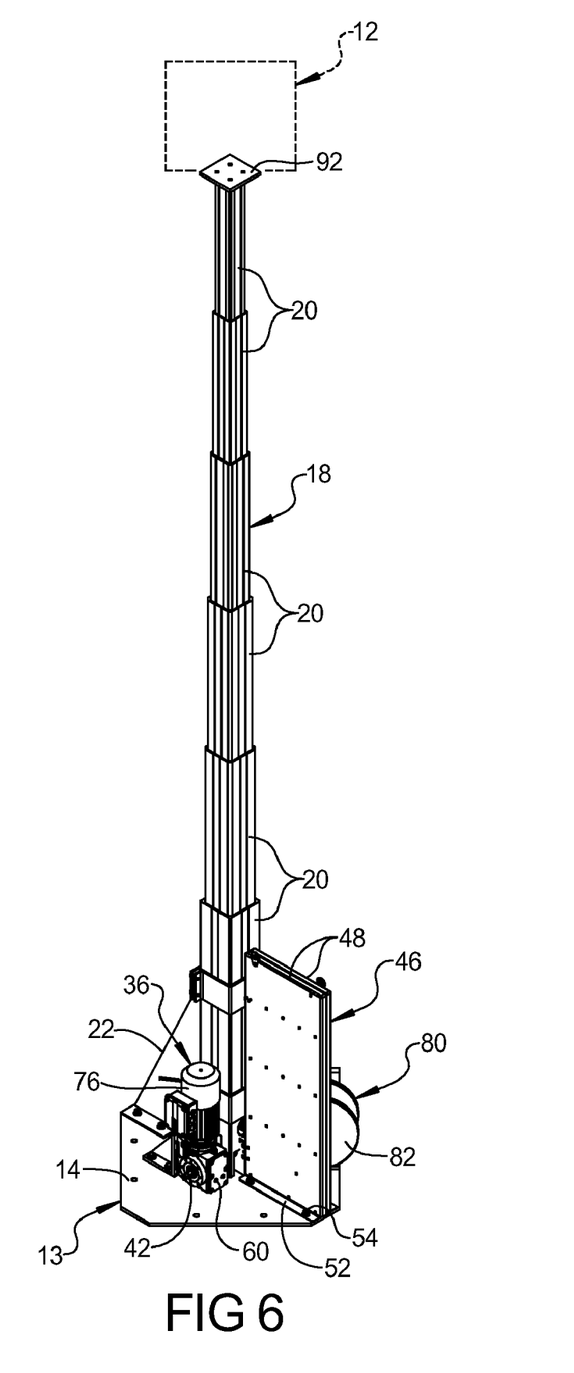
FIG. 6 is a perspective view of the telescopic mast system of FIG. 1 illustrated in a raised or extended position.
Figure 7:
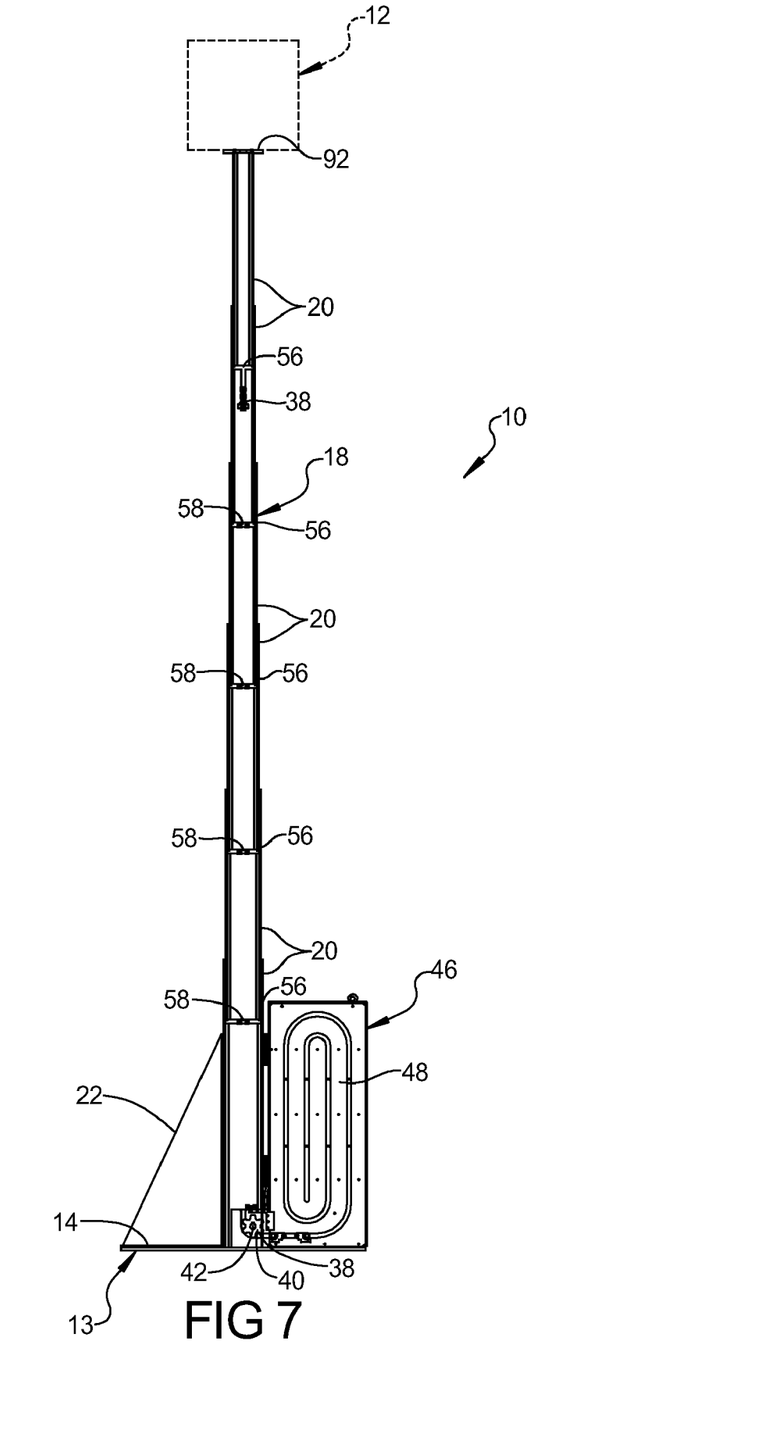
FIG. 7 is fragmentary front view of the telescopic mast system of FIG. 1 illustrated in a raised or extended position.
Figure 8:
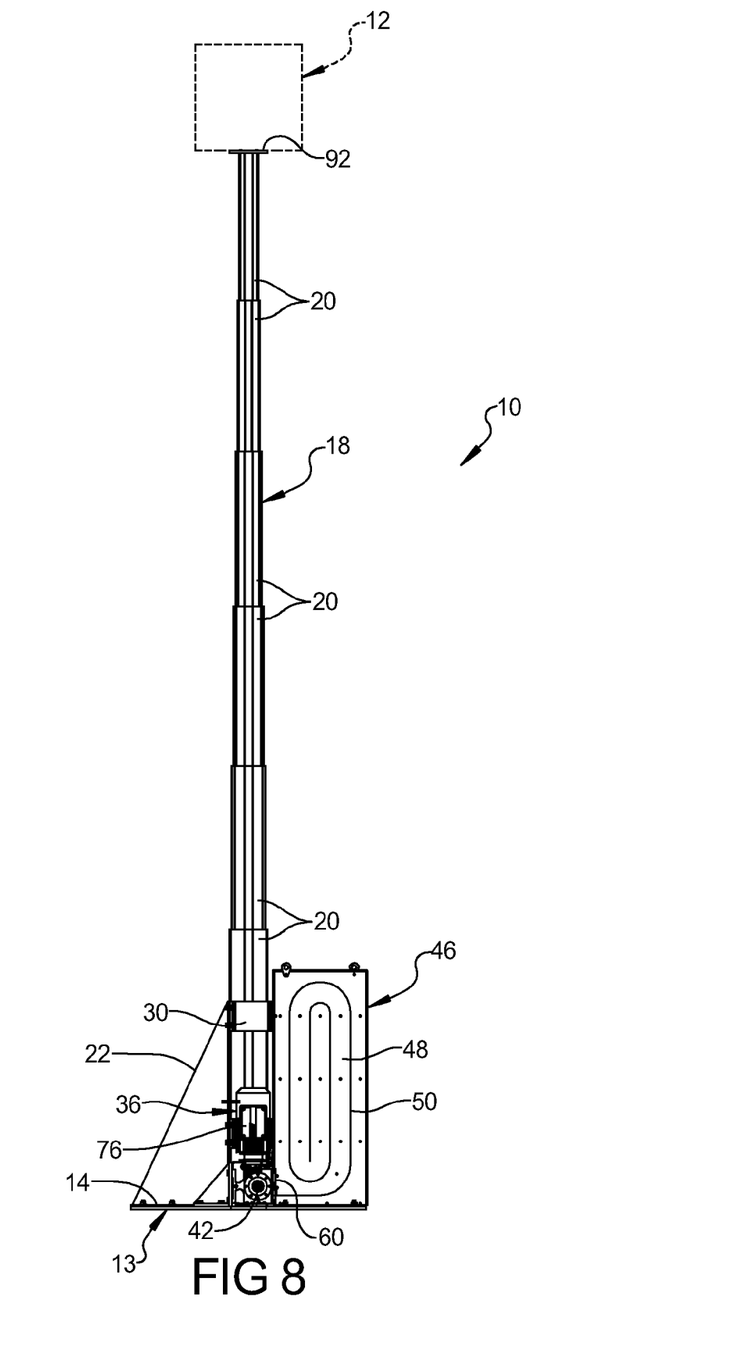
FIG. 8 is front view of the telescopic mast system of FIG. 1 illustrated in a raised or extended position.

Referring to either FIG. 1 or 2, the telescopic mast system 10 is in a retracted position. When the motor 76 is activated, the rotary movement of the motor 76 is transmitted to the transfer box 60, which rotates the shaft 42 and driving pinion 40. Rotation of the driving pinion 40 will move and extend the rigid chain 38. Since the guide plates 56 orientate and hold the rigid chain 38 in a vertical position, the extension of the rigid chain 38 will push against the guide plate 56 of the last mast section 20 and cause the last mast section 20 to move upwardly. Since the mast sections 20 are telescopic, the movement of the last mast section 20 will cause the other mast sections 20 (except the first mast section 20) to be moved and extended upwardly until the mast 18 is raised in a raised or extended position as illustrated in FIGS. 6 through 8. It should be appreciated that the first mast section 20 does not move. It should also be appreciated that the rotary motion of the motor 76 stops due to the limit switch to extend the mast 18 to the desired position. It should further be appreciated that, during a drive motion to extend the mast 18, the cable 86 is unwound from the reel 82 and travels upwardly inside the mast 18.

When it is desired to retract the mast 18, the motor 76 is reversed to rotate the shaft 42 and driving pinion 40 in the opposite direction to retract the rigid chain 38. The rigid chain 38 pulls on the guide plate 56 of the last mast section 20 downwardly to retract each mast section 20. As this occurs, the rigid chain 38 moves into the channel 50 of the chain magazine 46 and is disposed therein. It should be appreciated that the rotary motion of the motor 76 stops due to the limit switch to retract the mast 18 to the desired position.

The present invention has been described in an illustrative manner. It is to be understood that the terminology, which has been used, is intended to be in the nature of words of description rather than of limitation.

Many modifications and variations of the present invention are possible in light of the above teachings. Therefore, within the scope of the appended claims, the present invention may be practiced other than as specifically described.

What is claimed is:

1. A telescopic mast system comprising:
a telescopic mast comprising a plurality of telescopic mast sections; and
a drive mechanism for extending and retracting said telescopic mast sections, said drive mechanism including a rigid chain having one end connected to a last one of said telescopic mast sections to move said telescopic mast sections and a plurality of guide plates cooperating with said telescopic mast sections to prevent buckling of said rigid chain, wherein one of said guide plates is disposed inside and connected to one of said mast sections and each of said guide plates has an aperture to allow said rigid chain to extend and move axially therethrough to prevent lateral movement of said rigid chain.

2. A telescopic mast system as set forth in claim 1 wherein one of said guide plates is disposed at a bottom of one of said telescopic mast sections.

3. A telescopic mast system as set forth in claim 1 wherein said rigid chain is attached to said guide plate of the last one of said telescopic mast sections.

4. A telescopic mast system as set forth in claim 1 including a cable assembly for connection to the object.

5. A telescopic mast system as set forth in claim 4 wherein said cable assembly includes a rotatable reel and a cable wound on said reel and having one end for connection to a source and another end for connection to the object such that said cable travels inside of said telescopic mast.

6. A telescopic mast system as set forth in claim 1 including a chain magazine for containing said rigid chain when said telescopic mast is retracted.

7. A telescopic mast system as set forth in claim 4 wherein chain magazine comprises a pair of opposed plates, each plate having a groove to form a channel for receiving said rigid chain.

8. A telescopic mast system as set forth in claim 1 wherein said drive mechanism includes at least one rotatable driving pinion engaging said rigid chain, a shaft attached to said at least one driving pinion, and a motor for rotating said shaft to move said rigid chain to raise and lower said telescopic mast.

9. A telescopic mast system as set forth in claim 1 including a mounting mechanism to rigidly attach said telescopic mast to a support surface.

10. A telescopic mast system comprising:
a telescopic mast comprising a plurality of telescopic mast sections;
a mounting mechanism to rigidly attach a first one of said telescopic mast sections to a support surface; and
a drive mechanism for extending and retracting said telescopic mast sections, said drive mechanism including a rigid chain having one end connected to a last one of said telescopic mast sections, at least one rotatable driving pinion engaging said rigid chain, a shaft attached to said at least one driving pinion, a motor for rotating said shaft to move said rigid chain, and a plurality of guide plates cooperating with said telescopic mast sections to prevent buckling of said rigid chain, wherein one of said guide plates is disposed inside and connected to one of said mast sections and each of said guide plates has an aperture to allow the rigid chain to extend and move axially therethrough to prevent lateral movement of said rigid chain.

11. A telescopic mast system as set forth in claim 10 wherein one of said guide plates is disposed at a bottom of one of said telescopic mast sections.

12. A telescopic mast system as set forth in claim 11 wherein said rigid chain is attached to said guide plate of the last one of said telescopic mast sections.

13. A telescopic mast system as set forth in claim 10 including a cable assembly for connection to the object.

14. A telescopic mast system as set forth in claim 13 wherein said cable assembly includes a rotatable reel and a cable wound on said reel and having one end for connection to a source and another end for connection to the object such that said cable travels inside of said telescopic mast.

15. A telescopic mast system as set forth in claim 10 including a chain magazine for containing said rigid chain when said telescopic mast is retracted.

16. A telescopic mast system as set forth in claim 15 wherein chain magazine comprises a pair of opposed plates, each plate having a groove to form a channel for receiving said rigid chain.

17. A telescopic mast system comprising:
- a telescopic mast comprising a plurality of telescopic mast sections;
- a rigid chain disposed inside said telescopic mast and connected to a last one of said telescopic mast sections;
- a chain magazine for containing said rigid chain when said telescopic mast is retracted;
- a plurality of guide plates, one of said guide plates is disposed inside at a bottom of and connected to one of said telescopic mast sections, wherein each of said guide plates include an aperture to allow said rigid chain to extend and move therethrough to prevent lateral movement of said rigid chain, wherein said rigid chain is attached to said guide plate of a last of said telescopic mast sections; and
- a cable assembly for connection to the object.

18. A telescopic mast system as set forth in claim 17 wherein said cable assembly includes a rotatable reel and a cable wound on said reel and having one end for connection to a source and another end for connection to the object such that said cable travels inside of said telescopic mast.

19. A telescopic mast system as set forth in claim 17 wherein said drive mechanism includes at least one rotatable driving pinion engaging said rigid chain, a shaft attached to said at least one driving pinion, and a motor for rotating said shaft to move said rigid chain to raise and lower said telescopic mast.

20. A telescopic mast system as set forth in claim 17 including a mounting mechanism to rigidly attach said telescopic mast to a support surface.

* * * * *